(12) United States Patent
Mascitelli et al.

(10) Patent No.: US 12,322,222 B1
(45) Date of Patent: Jun. 3, 2025

(54) SYSTEMS AND METHODS FOR OPERATING FLEET MANAGEMENT SYSTEMS

(71) Applicant: Geotab Inc., Oakville (CA)

(72) Inventors: Nathan Patrick Mascitelli, Mississauga (CA); Abdolreza Bayesteh, Coquitlam (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 18/933,635

(22) Filed: Oct. 31, 2024

Related U.S. Application Data

(60) Provisional application No. 63/605,174, filed on Dec. 1, 2023.

(51) Int. Cl.
  *G07C 5/00* (2006.01)
  *G07C 5/08* (2006.01)

(52) U.S. Cl.
  CPC ........... *G07C 5/008* (2013.01); *G07C 5/0808* (2013.01)

(58) Field of Classification Search
  CPC .............................. G07C 5/008; G07C 5/0808
  See application file for complete search history.

(56) References Cited

U.S. PATENT DOCUMENTS 10,102,691 B1 * 10/2018 Ghanbari ................ G06F 16/27
11,823,504 B1    11/2023 Gulati et al.
2016/0232721 A1  8/2016 Singh et al.
2018/0218034 A1  8/2018 Sainaney
2018/0225974 A1  8/2018 Molin et al.
2023/0059859 A1  2/2023 Davidson et al.
2023/0281339 A1  9/2023 Chen et al.
2023/0379189 A1  11/2023 Mihovics et al.

OTHER PUBLICATIONS

International Search Report for International Application No. PCT/CA2024/051499, mailed Feb. 21, 2025, 6 pages.
Written Opinion for International Application No. PCT/CA2024/051499, mailed on Feb. 21, 2025, 8 pages.

* cited by examiner

*Primary Examiner* — Michael V Kerrigan
(74) *Attorney, Agent, or Firm* — Lawrence Xin-Tao Yu

(57) ABSTRACT

Systems and methods for operating fleet management systems are provided. The systems and methods can involve a plurality of device data importer services, at least one data access service, and a plurality of application programing interface (API) services. The plurality of device data importer services can receive and process first and second telematics data to generate first and second processed telematics data. The at least one data access service can store the first and second processed telematics data in first and second databases. The plurality of API services can receive first and second requests associated with the first and second processed telematics data and transmit first and second responses. The systems and methods can also involve an upgrader application and a plurality of client applications. The upgrader application can determine at least one supported schema change for the database and upgrade the database schema by applying the schema change.

21 Claims, 12 Drawing Sheets

| sname | sversion | dtconnect |
|---|---|---|
| API1 | 1.43 | 2023-06-07 10:55 |
| DDIS2 | 1.56 | 2023-05-23 22:55 |
| API2 | 1.45 | 2023-06-07 1:55 |

| Time | CA Version | UA Version | Description |
|---|---|---|---|
| $t_1$ | 1 | 1 | Schema up to date |
| $t_2$ | 2 | 1 | CA updated |
| $t_3$ | 2 | 2 | UA updated and applies update to DB |

FIG. 14

SYSTEMS AND METHODS FOR OPERATING FLEET MANAGEMENT SYSTEMS

CROSS-REFERENCE TO RELATED APPLICATIONS

This application claims priority to U.S. Provisional Patent Application No. 63/605,174 filed Dec. 1, 2023 and titled "SYSTEMS AND METHODS FOR OPERATING FLEET MANAGEMENT SYSTEMS", the contents of which are incorporated herein by reference for all purposes.

FIELD

The embodiments described herein generally relate to telematics devices and fleet management systems, and in particular, to fleet management software and database architectures.

BACKGROUND

The following is not an admission that anything discussed below is part of the prior art or part of the common general knowledge of a person skilled in the art.

Fleet management software and many other types of software have traditionally been implemented as monolithic applications. In other words, each instance of the software is a self-contained application that is executed as a single process. While smaller scale monolithic applications can be simple to deploy and maintain, monolithic architectures can present several limitations at larger scales. For example, monolithic architectures can be difficult to scale horizontally. Likewise, it can be difficult to perform upgrades without stopping the monolithic application.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with a broad aspect, there is provided a method for operating a fleet management system. The method involves operating at least one processor to: receive, using a plurality of device data importer services, first telematics data and second telematics data, the first telematics data originating from a first plurality of telematics devices installed in a first plurality of vehicles, the second telematics data originating from a second plurality of telematics devices installed in a second plurality of vehicles; process, using the plurality of device data importer services, the first and second telematics data to generate first and second processed telematics data; store, using at least one data access service, the first processed telematics data in a first database associated with the first plurality of telematics devices and the second processed telematics data in a second database associated with the second plurality of telematics devices; receive, using a plurality of application programing interface (API) services, a first request associated with the first processed telematics data and a second request associated with the second processed telematics data; retrieve, using the at least one data access service, at least some of the first processed telematics data from the first database and at least some of the second processed telematics data from the second database; and transmit, using the plurality of API services, a first response to the first request based the first processed telematics data and a second response to the second request based the second processed telematics data.

In some embodiments, each device data importer service, data access service, and API service can be executed in a separate virtual container.

In some embodiments, the method can involve operating the at least one processor to: store, using the plurality of device data importer services, a portion of the first processed telematics data and a portion of the second processed telematics data in at least one distributed cache; and retrieve, using the plurality of API services, the portion of the first processed telematics data and the portion of the second processed telematics data from the at least one distributed cache.

In some embodiments, the method can involve operating the at least one processor to: determine, using the plurality of API services, at least one telematics device in the first plurality of telematics devices that is no longer associated with the first database; and publish an indication that the at least one telematics device is no longer associated with the first database at a message queue.

In some embodiments, the plurality of device data importer services can include a load balancer operable to select one or more of the device data importer services to receive and process the first and second telematics data.

In some embodiments, the plurality of API services can include a load balancer operable to select one or more of the API services to receive the first and second requests and transmit the first and second responses.

In some embodiments, the first and second telematics data can be received and processed by the same device data importer service.

In some embodiments, the first and second requests can be received and the first and second responses are transmitted by the same API service.

In some embodiments, the method can involve operating the at least one processor to: determine, using the plurality of API services, a first tenant associated with the first request and a second tenant associated with the second request; and identify, using the at least one data access service, the first database based on the first tenant and the second database based on the second tenant.

In some embodiments, the method can involve operating the at least one processor to: upgrade, using the plurality of device data importer services, the schema of the first and second databases.

In some embodiments, processing the first and second telematics data can involve converting at least a portion of the first and second telematics data to a different format.

In some embodiments, processing the first and second telematics data can involve aggregating at least a portion of the first telematics data and aggregating at least a portion of the second telematics data.

In accordance with a broad aspect, there is provided a fleet management system including at least one data store and at least one processor. The at least one data store is operable to store a first and second database. The first database is associated with a first plurality of telematics devices installed in a first plurality of vehicles. The second database is associated with a second plurality of telematics devices installed in a second plurality of vehicles. The at least one processor operable to execute a plurality of device data importer services, at least one data access service, and a plurality of application programing interface (API) services. The plurality of device data importer services is operable to:

receive first telematics data and second telematics data, the first telematics data originating from the first plurality of telematics devices, the second telematics data originating from the second plurality of telematics devices; and process the first and second telematics data to generate first and second processed telematics data. The at least one data access service is operable to: store the first processed telematics data in the first database and the second processed telematics data in the second database; and retrieve at least some of the first processed telematics data from the first database and at least some of the second processed telematics data from the second database. The plurality of API services is operable to: receive a first request associated with the first processed telematics data and a second request associated with the second processed telematics data; and transmit a first response to the first request based the first processed telematics data and a second response to the second request based the second processed telematics data.

In some embodiments, each device data importer service, data access service, and API service can be executed in a separate virtual container.

In some embodiments, the plurality of device data importer services can be operable to store a portion of the first processed telematics data and a portion of the second processed telematics data in at least one distributed cache; and the plurality of API services can be operable to retrieve the portion of the first processed telematics data and the portion of the second processed telematics data from the at least one distributed cache.

In some embodiments, the plurality of API services can be operable to: determine at least one telematics device in the first plurality of telematics devices that is no longer associated with the first database; and publish an indication that the at least one telematics device is no longer associated with the first database at a message queue.

In some embodiments, the plurality of device data importer services can include a load balancer operable to select one or more of the device data importer services to receive and process the first and second telematics data.

In some embodiments, the plurality of API services can include a load balancer operable to select one or more of the API services to receive the first and second requests and transmit the first and second responses.

In some embodiments, the first and second telematics data can be received and processed by the same device data importer service.

In some embodiments, the first and second requests can be received and the first and second responses are transmitted by the same API service.

In some embodiments, the plurality of API services can be operable to determine a first tenant associated with the first request and a second tenant associated with the second request; and the at least one data access service can be operable to identify the first database based on the first tenant and the second database based on the second tenant.

In some embodiments, the plurality of device data importer services can be operable to upgrade the schema of the first and second databases.

In some embodiments, processing the first and second telematics data can involve converting at least a portion of the first and second telematics data to a different format.

In some embodiments, processing the first and second telematics data can involve aggregating at least a portion of the first telematics data and aggregating at least a portion of the second telematics data.

In accordance with a broad aspect, there is provided a method for operating a fleet management system. The method involves operating at least one processor to: provide a database, the database storing telematics data originating from a plurality of telematics devices installed in a plurality of vehicles, the database connectable to a plurality of client applications to provide access to the telematics data; determine, by an upgrader application separate from the plurality of client applications, a current schema version of a database; determine, by the upgrader application, based on the current schema version of the database, at least one available schema change for the database; determine, by the upgrader application, at least one client application connected to the database and a maximum supported schema version of the database by the at least one client application; determine, by the upgrader application, based on the current schema version and the maximum supported schema version, at least one supported schema change for the database; and update, by the upgrader application, the schema of the database by applying the at least one supported schema change to the database, whereby the schema of the database is updated by the upgrader application while the at least one client application is operational.

In some embodiments, the method can involve operating the at least one processor to: prior to determining the at least one supported schema change, update the at least one client application such that the at least one client application supports the at least one supported schema change.

In some embodiments, the at least one updated client application can be operable to detect whether the at least one supported schema change has been applied.

In some embodiments, updating the at least one client application can involve updating a plurality of instances of the at least one client application such that at least one instance of the at least one client application is operational while updating the at least one client application.

In some embodiments, the method can involve operating the at least one processor to: subsequent to updating the schema of the database, update the at least one client application such that the at least one client application does not support the previous schema of the database.

In some embodiments, the method can involve operating the at least one processor to: store, at the database, an indication of the current schema version of the database.

In some embodiments, the method can involve operating the at least one processor to: store, at the database, a record of client application connections to the database.

In some embodiments, the record of client application connections to the database can include, for each client application connection, a client application name, a client application connection time, and a client application supported schema version.

In some embodiments, determining the at least one client application connected to the database can involve: determining whether the at least one client application satisfies a predetermined recent connection time.

In some embodiments, updating the schema of the database by applying the at least one supported schema change can involve: adding, removing, and/or updating at least one column, table, and/or index of the database.

In some embodiments, updating the schema of the database by applying the at least one supported schema change can involve: modifying the data within at least one column of the database.

In accordance with a broad aspect, there is provided a fleet management system. The fleet management system includes at least one data store and at least one processor.

The at least one data store is operable to store a database. The database stores telematics data originating from a plurality of telematics devices installed in a plurality of vehicles. The database is connectable to a plurality of client applications to provide access to the telematics data. The at least one processor is operable to execute the plurality of client applications and an upgrader application separate from the plurality of client applications. The upgrader application is operable to: determine a current schema version of a database; determine, based on the current schema version of the database, at least one available schema change for the database; determine at least one client application connected to the database and a maximum supported schema version of the database by the at least one client application; determine, based on the current schema version and the maximum supported schema version, at least one supported schema change for the database; and update the schema of the database by applying the at least one supported schema change to the database, whereby the schema of the database is updated by the upgrader application while the at least one client application is operational.

In some embodiments, the at least one processor can be operable to: prior to determining the at least one supported schema change, update the at least one client application such that the at least one client application supports the at least one supported schema change.

In some embodiments, the at least one updated client application can be operable to detect whether the at least one supported schema change has been applied.

In some embodiments, updating the at least one client application can involve updating a plurality of instances of the at least one client application such that at least one instance of the at least one client application is operational while updating the at least one client application.

In some embodiments, the at least one processor can be operable to: subsequent to updating the schema of the database, update the at least one client application such that the at least one client application does not support the previous schema of the database.

In some embodiments, the at least one processor can be operable to: store, at the database, an indication of the current schema version of the database.

In some embodiments, the at least one processor can be operable to: store, at the database, a record of client application connections to the database.

In some embodiments, the record of client application connections to the database can include, for each client application connection, a client application name, a client application connection time, and a client application supported schema version.

In some embodiments, determining the at least one client application connected to the database can involve: determining whether the at least one client application satisfies a predetermined recent connection time.

In some embodiments, updating the schema of the database by applying the at least one supported schema change can involve: adding, removing, and/or updating at least one column, table, and/or index of the database.

In some embodiments, updating the schema of the database by applying the at least one supported schema change can involve: modifying the data within at least one column of the database.

In accordance with a broad aspect, there is provided a non-transitory computer readable medium having instructions stored thereon executable by at least one processor to implement any one of the methods herein.

BRIEF DESCRIPTION OF THE DRAWINGS

Several embodiments will be described in detail with reference to the drawings, in which:

FIG. 14 is a table of an example operation of a fleet management system to provide online database upgrades, in accordance with an embodiment.

Figure 1:
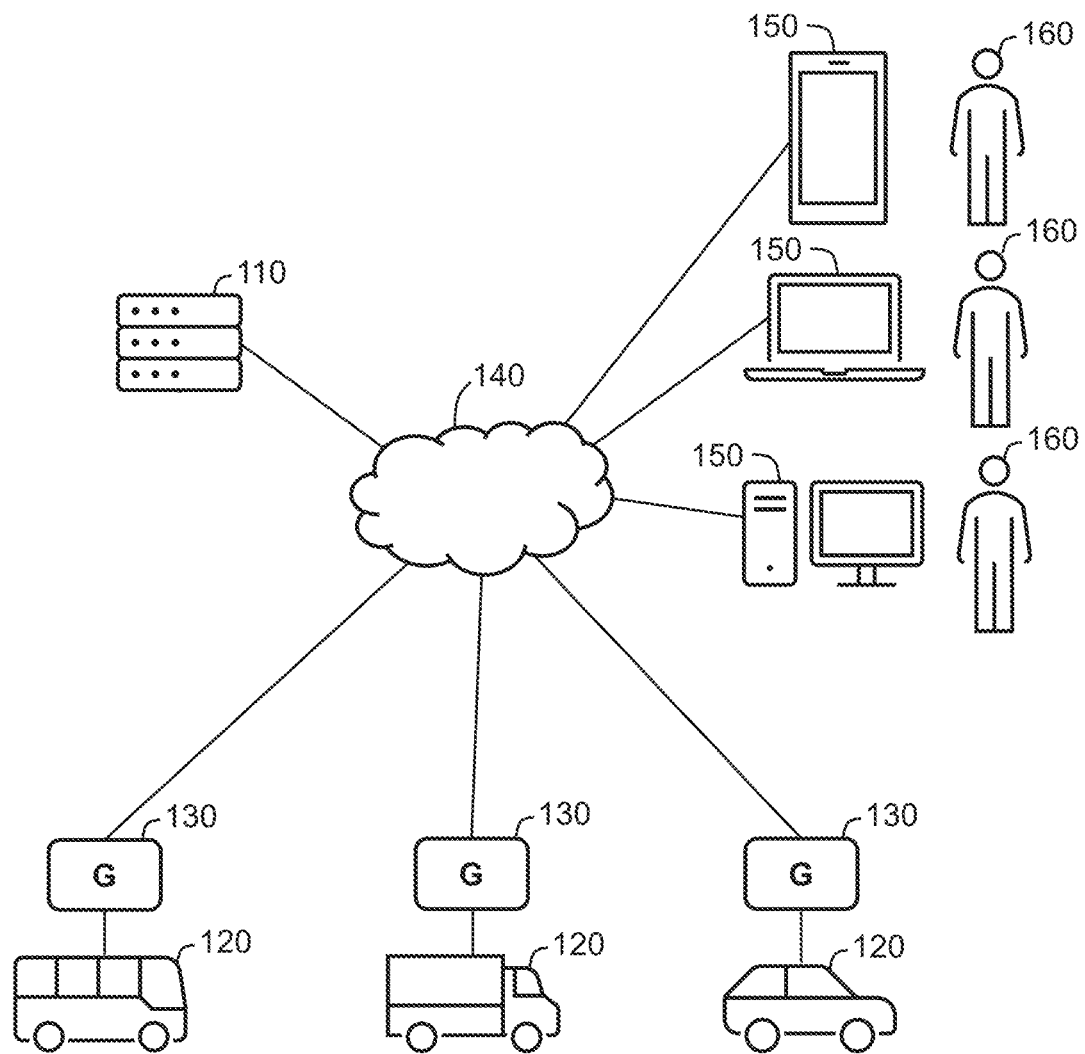
FIG. 1 is a block diagram of various components interacting with an example fleet management system, in accordance with an embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DETAILED DESCRIPTION

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Referring to FIG. 1, there is shown an example fleet management system 110 for managing a plurality of assets equipped with a plurality of telematics devices 130. In operation, the telematics devices 130 can gather various data associated with the assets (i.e., telematics data) and share the telematics data with the fleet management system 110. The fleet management system 110 can be remotely located from the telematics devices 130 and the assets.

For ease of exposition, various examples will now be described in which the assets are vehicles 120. However, it should be appreciated that the systems and methods described herein may be used to manage other forms of assets in some embodiments. Such assets can generally include any apparatuses, articles, machines, and/or equipment that can be equipped and monitored by the telematics devices 130. For example, other assets may include shipping containers, trailers, construction equipment, generators, and the like. The nature and format of the telematics data may vary depending on the type of asset.

The vehicles 120 may include any machines for transporting goods or people. The vehicles 120 can include motor vehicles, such as, but not limited to, motorcycles, cars, trucks, and/or buses. The motor vehicles can be gas, diesel, electric, hybrid, and/or alternative fuel. In some cases, the vehicles 120 may include other kinds of vehicles, such as, but not limited to, railed vehicles (e.g., trains, trams), watercraft (e.g., ships, boats), aircraft (e.g., airplanes, helicopters), and/or spacecraft. Each vehicle 120 can be equipped with a telematics device 130. Although only three vehicles 120 having three telematics devices 130 are shown in the illustrated example for ease of illustration, it should be appreciated that there can be any number of vehicles 120 and telematics devices 130. In some cases, the fleet management system 110 may manage hundreds, thousands, or even millions of vehicles 120 and telematics devices 130.

The telematics devices 130 can be standalone devices that are removably installed in the vehicles 120. Alternatively, the telematics devices 130 can be integrated components that are integral with the vehicles 120 such as, but not limited to, telematic control units (TCUs). The telematics devices 130 can gather various telematics data from the vehicles 120 and share the telematics data with the fleet management system 110. The telematics data may include any information, parameters, attributes, characteristics, and/or features associated with the vehicles 120. For example, the telematics data can include, but is not limited to, location data, speed data, acceleration data, engine data, brake data, transmission data, fluid data (e.g., oil, coolant, and/or washer fluid), energy data (e.g., battery and/or fuel level), odometer data, vehicle identifying data, error/diagnostic data, tire pressure data, seatbelt data, and/or airbag data. In some cases, the telematics data may include information related to the telematics devices 130 and/or other devices associated with the telematics devices 130.

The fleet management system 110 can process the telematics data collected from the telematics devices 130 to provide various analysis, predictions, and reporting. For example, the fleet management system 110 can process the telematics data to gain additional information regarding the vehicles 120, such as, but not limited to, trip distances/times, idling times, harsh braking/driving, usage rate, and/or fuel economy. Various data analytics and machine learning techniques may be used by the fleet management system 110 to process the telematics data. The telematics data can then be used to manage various aspects of the vehicles 120, such as, but not limited to, route planning, vehicle maintenance, driver compliance, asset utilization, and/or fuel management. In this manner, the fleet management system 110 can improve the productivity, efficiency, safety, and/or sustainability of the vehicles 120.

A plurality of computing devices 150 can provide access to the fleet management system 110 to a plurality of users 160. This may allow the users 160 to manage and track the vehicles 120, for example, using various telematics data collected and/or processed by the fleet management system 110. The computing devices 150 can be any computers, such as, but not limited to, personal computers, portable computers, wearable computers, workstations, desktops, laptops, smartphones, tablets, smartwatches, PDAs (personal digital assistants), and/or mobile devices. The computing devices 150 can be remotely located from the fleet management system 110, telematics devices 130, and vehicles 120. Although only three computing devices 150 operated by three users 160 are shown in the illustrated example for ease of illustration, it should be appreciated that there can be any number of computing devices 150 and users 160. In some cases, the fleet management system 110 may service hundreds, thousands, or even millions of computing devices 150 and users 160.

The fleet management system 110, telematics devices 130, and computing devices 150 can communicate through one or more networks 140. The networks 140 may be wireless, wired, or a combination thereof. The networks 140 may employ any communication protocol and utilize any communication medium. For example, the networks 140 may include, but is not limited to, Wi-Fi™ networks, Ethernet networks, Bluetooth™ networks, NFC (near-field communication) networks, radio networks, cellular networks, and/or satellite networks. The networks 140 may be private, public, or a combination thereof. For example, the networks 140 may include, but is not limited to, LANs (local area networks), WANs (wide area networks), and/or the Internet. The networks 140 may also facilitate communication with other devices and systems that are not shown.

The fleet management system 110 can be implemented using one or more computers. For example, the fleet management system 110 may be implemented using one or more computer servers. The servers can be distributed across a wide geographical area. In some embodiments, the fleet management system 110 may be implemented using a cloud computing platform, such as Google Cloud Platform™ or Amazon Web Services™. In other embodiments, the fleet management system 110 may be implemented using one or more dedicated computer servers.

Figure 2:
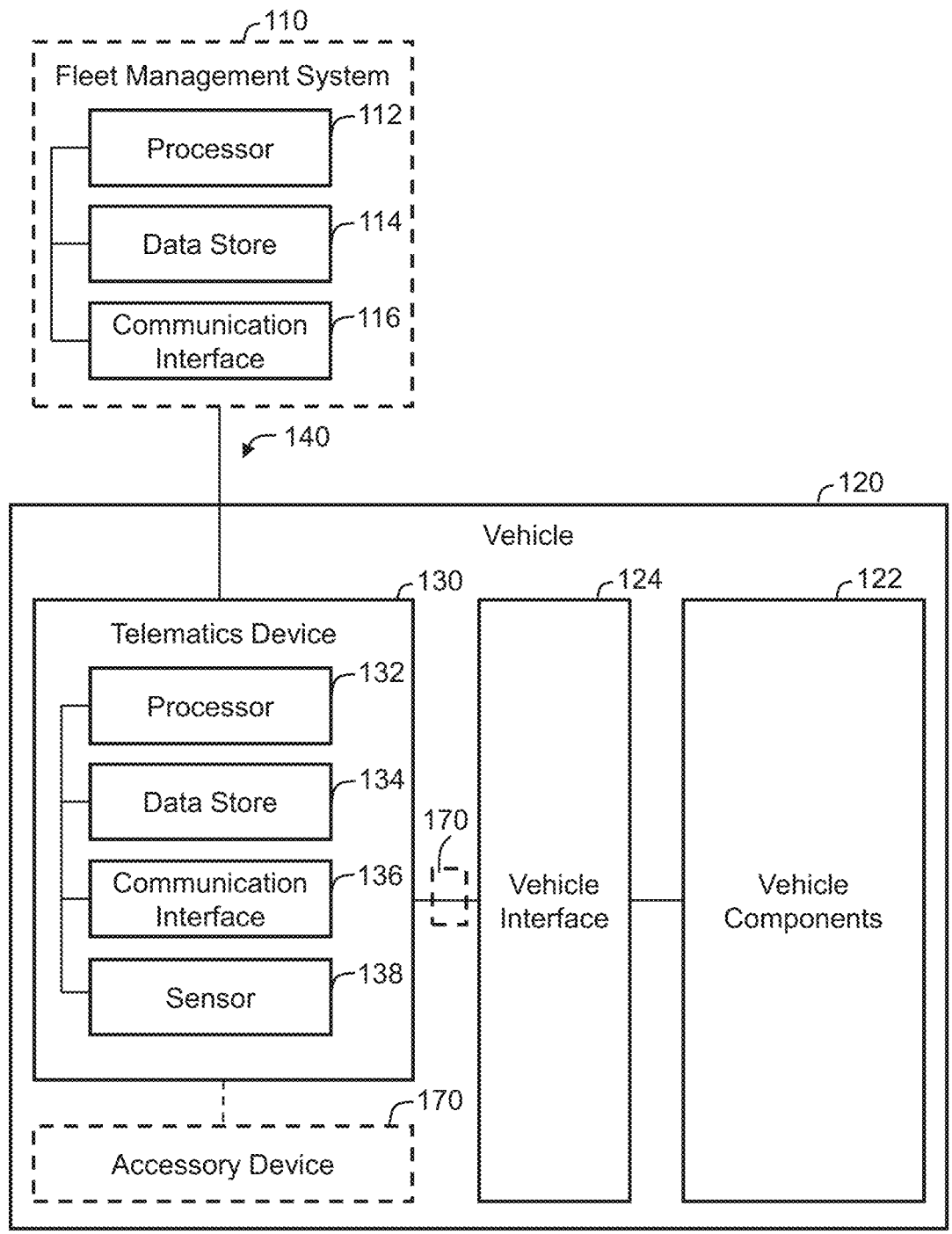
FIG. 2 is a block diagram of an example fleet management system interacting with an example telematics device and example vehicle, in accordance with an embodiment.

Reference will now be made to FIG. 2 to further explain the operation of the fleet management system 110, telematics devices 130, and vehicles 120. In the illustrated example, the fleet management system 110 in communication with a telematics device 130 that is installed in a vehicle 120.

As shown, the fleet management system 110 can include one or more processors 112, one or more data stores 114, and one or more communication interfaces 116. Each of these components may communicate with each other. Each of these components may be combined into fewer components or divided into additional subcomponents. Two or more of these components and/or subcomponents may be distributed across a wide geographical area.

The processors 112 can control the operation of the fleet management system 110. The processors 112 can be implemented using any suitable processing devices or systems, such as, but not limited to, CPUs (central processing units), GPUs (graphics processing units), FPGAs, (field programmable gate arrays), ASICs (application specific integrated circuits), DSPs (digital signal processors), NPUs (neural processing units), QPUs (quantum processing units), microprocessors, and/or controllers. The processors 112 can execute various computer instructions, programs, and/or software stored on the data stores 114 to implement various methods described herein. For example, the processors 112 may process various telematics data collected by the fleet management system 110 from the telematics device 130.

The data stores 114 can store various data for the fleet management system 110. The data stores 114 can be implemented using any suitable data storage devices or systems, such as, but not limited to, RAM (random access memory), ROM (read only memory), flash memory, HDD (hard disk drives), SSD (solid-state drives), magnetic tape drives, optical disc drives, and/or memory cards. The data stores 114 may include volatile memory, non-volatile memory, or a combination thereof. The data stores 114 may include non-transitory computer readable media. The data stores 114 can store various computer instructions, programs, and/or software that can be executed by the processors 112 to implement various methods described herein. The data stores 114 may store various telematics data collected from the telematics device 130 and/or processed by the processors 112.

The communication interfaces 116 can enable communication between the fleet management system 110 and other devices or systems, such as the telematics device 130. The communication interfaces 116 can be implemented using any suitable communication devices or systems. For example, the communication interfaces 116 may include various physical connectors, ports, or terminals, such as, but not limited to, USB (universal serial bus), Ethernet, Thunderbolt, Firewire, SATA (serial advanced technology attachment), PCI (peripheral component interconnect), HDMI (high-definition multimedia interface), and/or DisplayPort. The communication interfaces 116 can also include various wireless interface components to connect to wireless networks, such as, but not limited to, Wi-Fi™, Bluetooth™, NFC, cellular, and/or satellite. The communication interfaces 116 can enable various inputs and outputs to be received at and sent from the fleet management system 110. For example, the communication interfaces 116 may be used to retrieve telematics data from the telematics device 130.

As shown, the telematics device 130 also can include one or more processors 132, one or more data stores 134, and one or more communication interfaces 136. Additionally, the telematics device 130 can include one or more sensors 138. Each of these components may communicate with each other. Each of these components may be combined into fewer components or divided into additional subcomponents.

The processors 132 can control the operation of the telematics device 130. Like the processors 112 of the fleet management system 110, the processors 132 of the telematics device 130 can be implemented using any suitable processing devices or systems. The processors 132 can execute various computer instructions, programs, and/or software stored on the data stores 134. For example, the processors 132 can process various telematics data gathered from the vehicle components 122 or the sensors 138.

The data stores 134 can store various data for the telematics device 130. Like the data stores 114 of the fleet management system 110, the data stores 134 of the telematics device 130 can be implemented using any suitable data storage devices or systems. The data stores 134 can store various computer instructions, programs, and/or software that can be executed by the processors 132. The data stores 134 can also store various telematics data gathered from the vehicle components 122 or the sensors 138.

The communication interfaces 136 can enable communication between the telematics device 130 and other devices or systems, such as the fleet management system 110 and vehicle components 122. Like the communication interfaces 116 of the fleet management system 110, the communication interfaces 136 of the telematics device 130 can be implemented using any suitable communication devices or systems. The communication interfaces 136 can enable various inputs and outputs to be received at and sent from the telematics device 130. For example, the communication interfaces 136 may be used collect telematics data from the vehicle components 122 and sensors 138 or to send telematics data to the fleet management system 110. The communication interfaces 136 can also be used to connect the telematics device 130 with one or more accessory devices 170.

The sensors 138 can detect and/or measure various environmental events and/or changes. The sensors 138 can include any suitable sensing devices or systems, including, but not limited to, location sensors, velocity sensors, acceleration sensors, orientation sensors, vibration sensors, proximity sensors, temperature sensors, humidity sensors, pressure sensors, optical sensors, and/or audio sensors. When the telematics device 130 is installed in the vehicle 120, the sensor 138 can be used to gather telematics data that may not be obtainable from the vehicle components 122. For example, the sensors 138 may include a satellite navigation device, such as, but not limited to, a GPS (global positioning system) receiver, which can measure the location of the vehicle 120. As another example, the sensor 138 may include accelerometers, gyroscopes, magnetometers, and/or IMUs (inertial measurement units), which can measure the acceleration and/or orientation of the vehicle 120.

In some cases, the telematics device 130 may operate in conjunction with one or more accessory devices 170 that are in communication with the telematics device 130. The accessory devices 170 can include expansion devices that can provide additional functionality to the telematics device 130. For example, the accessory devices 170 may provide additional processing, storage, communication, and/or sensing functionality through one or more additional processors, data storages, communication interfaces, and/or sensors (not shown). The accessory devices 170 can also include adapter devices that facilitate communication between the communication interface 136 and the vehicle interfaces 124, such as a cable harness.

The telematics device 130 can be installed within the vehicle 120, removably or integrally. One or more accessory devices 170 can also be installed in the vehicle 120 along with the telematics device 130. As shown, the vehicle 120 can include one or more vehicle components 122 and one or more vehicle interfaces 124. Each of these components may be combined into fewer components or divided into additional subcomponents.

The vehicle components 122 can include any subsystems, parts, and/or subcomponents of the vehicle 120. The vehicle components 122 can be used to operate and/or control the vehicle 120. For example, the vehicle components 122 can include, but are not limited to, powertrains, engines, transmissions, steering, braking, seating, batteries, doors, and/or suspensions. The telematics device 130 can gather various telematics data from the vehicle components 122. For example, the telematics device 130 may communicate with one or more ECUs (electronic control units) that control the vehicle components 122 and/or one or more internal vehicle sensors.

The vehicle interfaces 124 can facilitate communication between the vehicle components 122 and other devices or systems. The vehicle interfaces 124 can include any suitable communication devices or systems. For example, the vehicle interfaces 124 may include, but is not limited to, ODB-II (on-board diagnostics) ports and/or CAN (controller area network) buses. The vehicle interfaces 124 can be used by the telematics device 130 to gather telematics data from the vehicle components 122. For example, the communication interfaces 136 of the telematics device 130 can be connected to the vehicle interfaces 124 to communicate with the vehicle components 122. In some cases, an accessory device 170, such as a wire harness, can provide the connection between the communication interface 136 and the vehicle interface 124.

Figure 3:
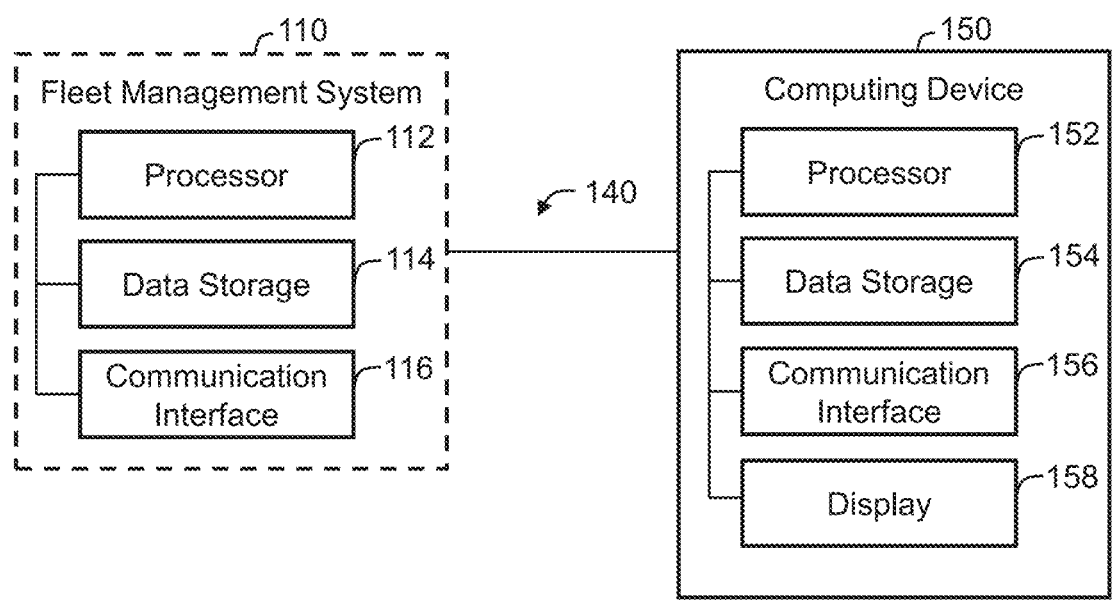
FIG. 3 is a block diagram of an example computing device interacting with an example fleet management system, in accordance with an embodiment.

Reference will now be made to FIG. 3 to further explain the operation of the fleet management system 110 and computing devices 150. In the illustrated example, the fleet management system 110 in communication with a computing device 150. As shown, the computing device 150 also can include one or more processors 152, one or more data stores 154, and one or more communication interfaces 156. Additionally, the computing device 150 can include one or more displays 158. Each of these components can communicate with each other. Each of these components may be combined into fewer components or divided into additional subcomponents.

The processors 152 can control the operation of the computing device 150. Like the processors 112 of the fleet management system 110 and the processors 132 of the telematics device 130, the processors 152 of the computing device 150 can be implemented using any suitable processing devices or systems. The processors 152 can execute various computer instructions, programs, and/or software stored on the data stores 154 to implement various methods described herein. For example, the processors 152 may process various telematics data received from the fleet management system 110 and/or the telematics device 130.

The data stores 154 can store various data for the computing device 150. Like the data stores 114 of the fleet management system 110 and the data stores 134 of the telematics device 130, the data stores 154 of the computing device 150 can be implemented using any suitable data storage devices or systems. The data stores 154 can store various computer instructions, programs, and/or software that can be executed by the processor 152 to implement various methods described herein. The data stores 154 may store various telematics data received from the fleet management system 110 and/or the telematics device 130.

The communication interfaces 156 can enable communication between the computing device 150 and other devices or systems, such as the fleet management system 110. Like the communication interfaces 116 of the fleet management system 110 and the communication interfaces 136 of the telematics device 130, the communication interfaces 156 of the computing device 150 can be implemented using any suitable communication devices or systems. The communication interfaces 156 can enable various inputs and outputs to be received at and sent from the computing device 150. For example, the communication interfaces 116 may be used to retrieve telematics data from the fleet management system 110.

The displays 158 can visually present various data for the computing device 150. The displays 158 can be implemented using any suitable display devices or systems, such as, but not limited to, LED (light-emitting diode) displays, LCDs (liquid crystal displays), ELDs (electroluminescent displays), plasma displays, quantum dot displays, and/or cathode ray tube (CRT) displays. The displays 158 can be an integrated component that is integral with the computing device 150 or a standalone device that is removably connected to the computing device 150. The displays 158 can present various user interfaces for various computer applications, programs, and/or software associated with various methods described herein. For example, the displays 158 may display various visual representations of the telematics data.

Figure 4A:
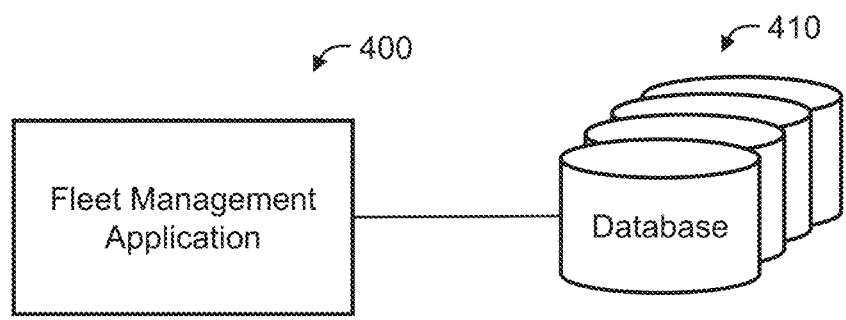
FIG. 4A is a block diagram of an example implementation of a monolithic fleet management application, in accordance with an embodiment.

Referring to FIG. 4A, there is shown an example fleet management application 400. The fleet management application 400 is a software application or computer program that can be executed by the fleet management system 110 (e.g., by operating at least one processor 112 based on instructions stored on at least one data store 114). The fleet management application 400 can provide various functionality on the fleet management system 110. For example, the fleet management application 400 can ingest, process, store, retrieve, and transmit telematics data originating from the telematics devices 130.

As shown, the fleet management application 400 can be connected to a plurality of databases 410. The databases 410 can store telematics data (e.g., in data stores 114) ingested and processed by the fleet management application 400. The stored telematics data can be retrieved and utilized by the fleet management application 400 in various ways. For example, the fleet management application 400 may retrieve and transmit telematics data in response to various API (application programming interface) calls.

Each database 410 can be associated with a tenant, or group of users 160. Each database 410 can store telematics data corresponding to the associated tenant. In other words, each database 410 can store telematics data originating from telematics devices 130 and vehicles 120 corresponding to the associated tenant 160. In this manner, the telematics data of a particular tenant 160 can be isolated to a particular database 410 and access to that database 410 can be restricted to that tenant 160 by the fleet management application 400. In this manner, each database 410 can be physically located to meet the data residency requirements of the associated tenant 160.

In the illustrated example, the fleet management application 400 is a monolithic application. In other words, the fleet management application 400 is a self-contained application that is executed as a single process. Because the fleet management application 400 is monolithic, it can be implemented as a single codebase. This singular codebase can be relatively easy to build and maintain while the application 400 is relatively small. However, as the number of features in the application increase, the codebase may become difficult to maintain—it may be difficult for developers to work on individual features without affecting others. As well, the monolithic application 400 may be susceptible to failure, as a single bug or issue in one feature could crash or bring down the entire application 400. Furthermore, deploying updates or upgrades to the monolithic application 400 may result in unacceptable downtime of critical features for users 160. Additionally, it may be difficult to scale the monolithic application 400 to handle larger workloads.

One approach to scaling the monolithic application 400 is scaling up or vertically scaling. For example, a larger instance of the monolithic application 400 can be run on a more powerful computer server, virtual machine, or container. However, it can quickly become impractical or even impossible to provide sufficient resources to run the monolithic application 400 using a single computer server, virtual machine, or container.

Figure 4B:
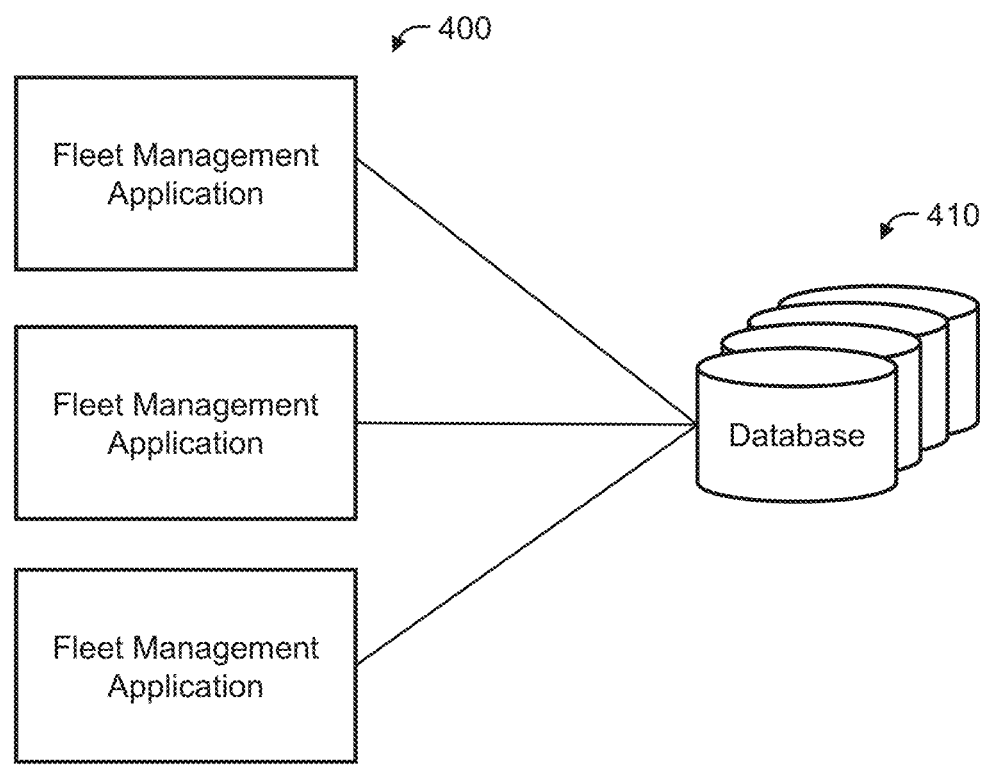
FIG. 4B is a block diagram of another example implementation of a monolithic fleet management application, in accordance with an embodiment.

Another approach to scaling the monolithic application 400 is scaling out or horizontally scaling, as shown in FIG. 4B. As shown, the monolithic application 400 can be scaled horizontally by running additional instances of the monolithic application 400. In this manner, instances of the monolithic application 400 can be run on separate computer servers, virtual machines, or containers. However, because the fleet management application 400 is monolithic, deploying multiple instances of the application 400 can result in inefficient use of resources and bottlenecking. For example, it can be difficult or even impossible to coordinate load between the instances of the fleet management application 400. As well, individual features of the monolithic application 400 cannot be separately scaled.

The inventors recognized and realized that the architecture of the monolithic fleet management application 400 may be unsuitable for at larger scales. In other words, the monolithic application 400 may be unable to handle the workload associated with larger numbers of telematics devices 130, such as thousands, millions, or even more devices. Likewise, the monolithic application 400 may not be suitable of supporting the large feature set required by a wide variety of tenants 160. As explained herein, at scale, the monolithic application 400 may present several problems, including, but not limited to, difficulties supporting a single codebase, susceptibility to crashes bringing down the entire application, downtime while deploying updates, and difficulties scaling horizontally. The inventors recognized and realized that a different application architecture may ameliorate at least some these problems, which will now be explained with reference to FIG. 5.

Figure 5:
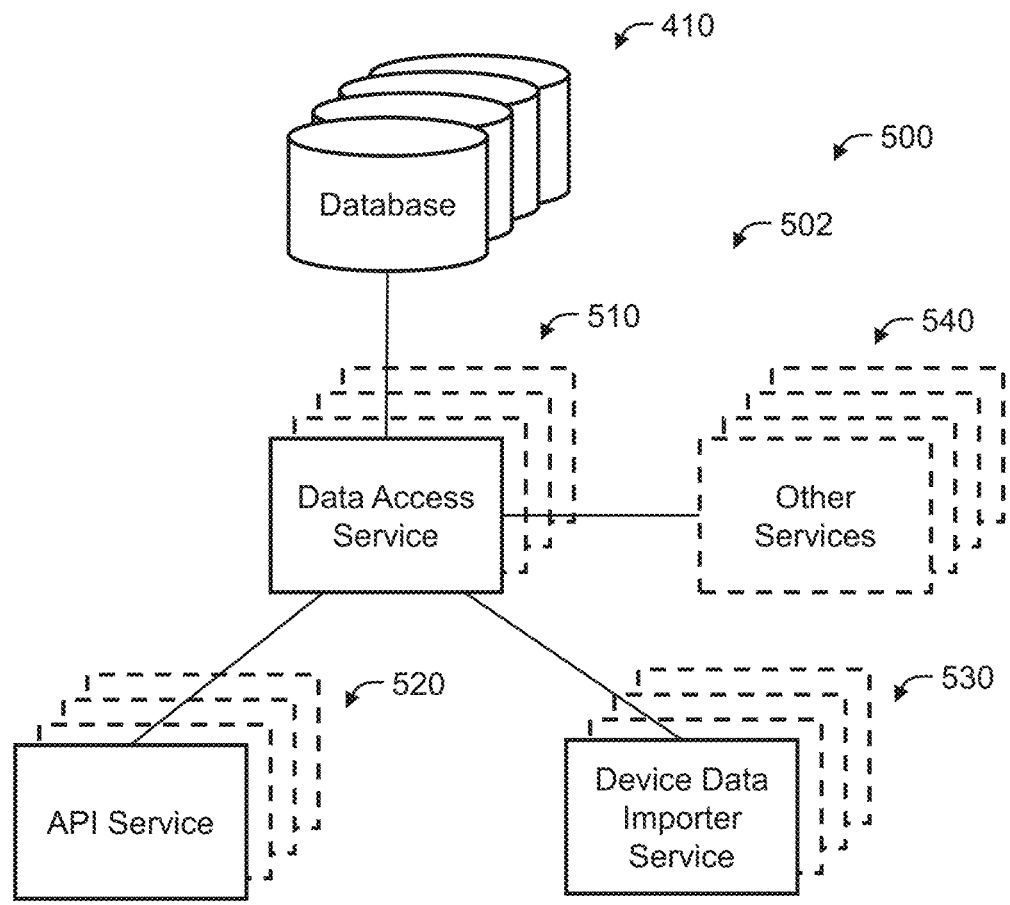
FIG. 5 is a block diagram of an example implementation of a service-oriented fleet management application, in accordance with an embodiment.

Referring to FIG. 5, there is shown another fleet management application 500. The fleet management application 500 is also a software application or computer program that can be executed by the fleet management system 110 and provide various functionality on the fleet management system 110. Likewise, the fleet management application 500 can be connected to the plurality of databases 410 to store and retrieve various telematics data. As well, each database 410 can be associated with a single tenant or group of users 160.

In the illustrated example, the fleet management application 500 is a service-oriented application. That is, the fleet management application 500 is made up of a plurality of services 502. Each service 502 can perform a specific task (or specific set of tasks) or provide a specific functionality (or specific set of functionalities). Each service 502 can be executed as an independent process. Hence, each service 502 can have a separate, distinct codebase-therefore, the fleet management application 500 can have a plurality of separate, distinct codebases, rather than a single, shared, or monolithic codebase.

A service-oriented or microservice architecture can have several advantages over a monolithic architecture. For example, each service 502 can be scaled independently and horizontally. The services 502 can be replicated and deployed across multiple computer servers, virtual machines, or containers to handle increased loads. In this manner, specific parts of the fleet management application 500 that require additional resources can be scaled, rather than scaling an entire monolith. The microservice application 500 can also have greater resilience to failure. Since each service 502 can run independently, a failure or issue in one microservice does not necessarily bring down the entire application 500. Additionally, updates can be deployed to individual services without affecting the entire application 500. The microservice application 500 can also allow developers to work on individual services 502 without affecting others. Additionally, developers can choose different technologies and programming languages for each service 502.

In the illustrated example, the services 502 include a data access service 510, API (application programming interface) service 520, and device data importer service 530. Optionally, the management application 500 can also include other or additional services 540, in some embodiments. As shown, each service 502 can be scaled up or down to meet the demands of the fleet management application 500. In other words, additional or fewer instances of each service 502 can be instantiated in response to the workload requirements of the fleet management application 500. It should be appreciated that each service 502 can be multi-tenant. That is, each service instance may not be restricted to a particular tenant or group of users 160 and may be used by any given tenant. Put another way, more than one tenant 160 can use the same instance of a service 502. As should also be appreciated, each service instance can be executed on a separate computer server, virtual machine, virtual container.

The data access service 510 can provide access to the databases 410. For example, the data access service 510 can be used to store telematics data in the databases 410. Likewise, the data access service 510 can be used to retrieve telematics data from the databases 410. The data access service 510 can be used by other services, which may not have direct access to the databases 410, to access the databases 410. An advantage of the data access service 510 is that it can abstract reading and writing operations to the databases 410 for the other services. In this manner, the other services may not be required to know the specifics of the databases 410, such as, but not limited to the schema, location, etc. Instead, the other services can rely on the data access service 510 to store and retrieve telematics data from the databases 410. In some cases, the data access service 510 can be used to update the schema of the databases 410.

The API (application programming interface) service 520 can receive various requests (i.e., API calls) associated with the telematics data stored in the databases 410 and generate and transmit responses to the requests. For example, the API service 520 may receive a request for telematics data stored in the databases 410. The API service can respond to the request using telematics data retrieved by the data access service 510. In this manner, the API service 520 can provide various functionality to the users 160 accessing the fleet management application 500. For example, a web browser or other client application running on a computing device 150 can transmit requests for telematics data to the API service 520, receive responses with the requested telematics data, and display or present the telematics data to the user 160.

The device data importer service 530 can import or ingest telematics data originating from the telematics devices 130. The telematics data can be received directly or indirectly from the telematics devices 130. For example, the telematics data may be received from one or more intermediate systems, such as, but not limited to, gateways, bridges, protocol converters, etc. The device data importer service 530 can process the received telematics data in various ways to generate processed telematics data that is suitable or compatible for the fleet management application 500. For example, the device data importer service 530 may parse streams of raw telematics data into formatted telematics data records. The parsing may involve translating status, diagnostic, or fault codes or identifiers. The parsing may also involve reformatting or converting the telematics data, for example, by applying conversion factors or offsets. The device data importer service 530 may also process the telematics data by generating additional data based on the raw telematics data. For example, the raw telematics data may be used to determine vehicle trips, stop durations, idling durations, etc. As another example, the raw telematics data may be used to identify exception events that violate predetermined rules or criteria, such as speeding, seatbelt non-compliance, harsh acceleration, braking, or cornering, etc. The device importer service 530 can store the processed telematics data in the databases 410 using the data access service 510.

As shown, the fleet management application 500 can include various other services 540, in some embodiments. The other services 540 can provide various other functionalities or perform various other tasks for the fleet management application 500. For example, the other services 540 may include a reporting service for automatically generating reports to present certain telematics data in particular organized formats. As another example, the other services 540 may include a map service for providing information relating roads and other geographical features, such as, but not limited to road names, speed limits, etc. As a further example, the other services 540 may include a static file service for serving static files, such as images, text, CSS (Cascading Style Sheets), HTML (HyperText Markup Language), JavaScript, etc., for example, to a web browser or other client application running on a computing device 150 operated by a user 160 to interact with the fleet management application 500. For clarity of illustration and brevity, these various services have been illustrated as the other services 540. However, it should be appreciated that the fleet management application 500 can include any number and/or type of services.

Figure 6:
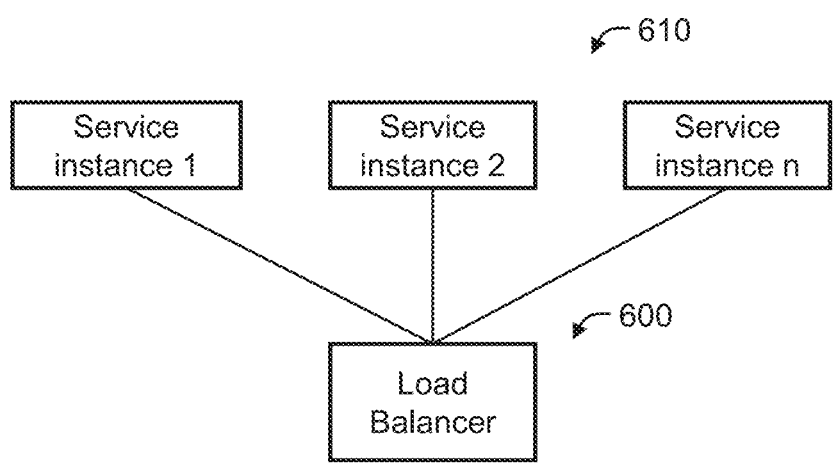
FIG. 6 is a block diagram of an example implementation of a load balancer for a plurality of service instances, in accordance with an embodiment.

Referring now to FIG. 6, there is shown an example implementation of a load balancer 600 for a plurality of instances 610 of a service 502. In operation, the load balancer 600 can distribute traffic among the service instances 610. In other words, the load balancer 600 can act as a reverse proxy that receives incoming requests and routes them to the appropriate service instance 610. In this manner, the load balancer 600 can ensure that the service instances 610 are being used efficiently, prevent any single service instance 610 from being overwhelmed by excess load, and improve the overall responsiveness of the service. The load balancer 600 may use various algorithms in order to determine the distribution of requests among the service instances 610. For example, the algorithms may include, but are not limited to, round-robin, least connections, least response time, IP hash, etc. In some cases, the load balancer 600 may continuously monitor the health and availability of the service instances 610 to assess whether the service instances are capable of handling requests.

Any of the services 502 described herein may include a load balancer 600, especially when there is more than once instance of the service 502. For example, the data access service 510 may include a load balancer 600 that distributes requests to store or retrieve data from the databases 410 across a plurality of data access service instances 510. Likewise, the API service 520 may include a load balancer 600 to distribute API requests among a plurality of API service instances. Similarly, the device data importer service 530 can include a load balancer 600 that distributes requests to ingest telematics data among a plurality of device data importer service instances. As well, any of the other services 540 may include a load balancer 600 that distributes requests among the respective service instances.

Figure 7:
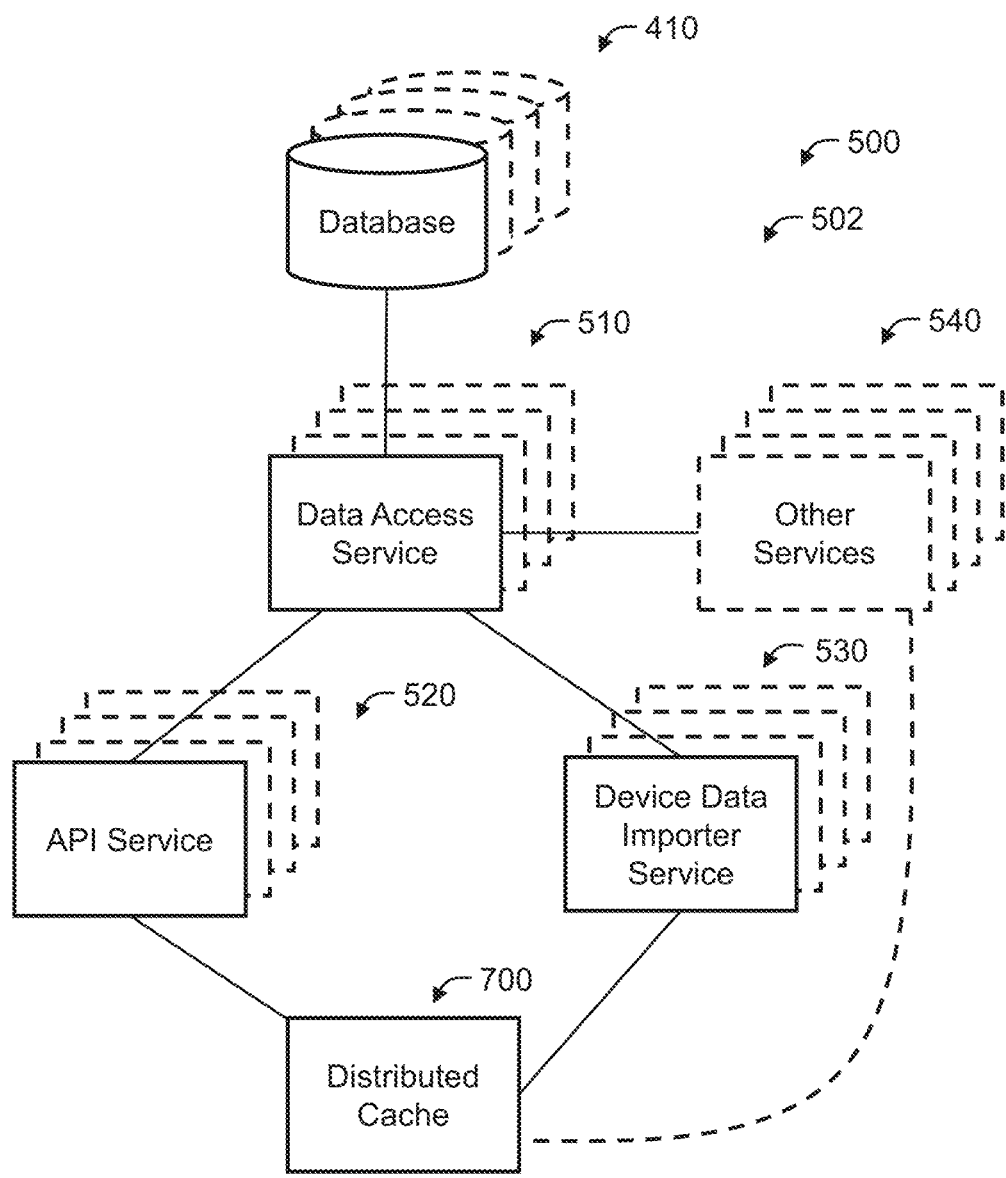
FIG. 7 is a block diagram of an example implementation of a distributed cache for a fleet management application, in accordance with an embodiment.

Referring now to FIG. 7, there is shown an example implementation of a distributed cache 700 for a plurality of services 502. The distributed cache 700 can store various data to improve the efficiency and speed of data retrieval by the various services 502. The distributed cache 700 can act as a storage buffer that stores frequently accessed or recently used data. For example, the device data importer service 530 can store telematics data in the distributed cache 700, which can be retrieved by the API service 520. In this manner, the API service 520 can access the telematics data without retrieving it from the databases 410. This can reduce the amount of time required to access the telematics data. The fleet management application 500 may include any number of distributed caches 700, each of which can be used by one or more services 502.

Figure 8:
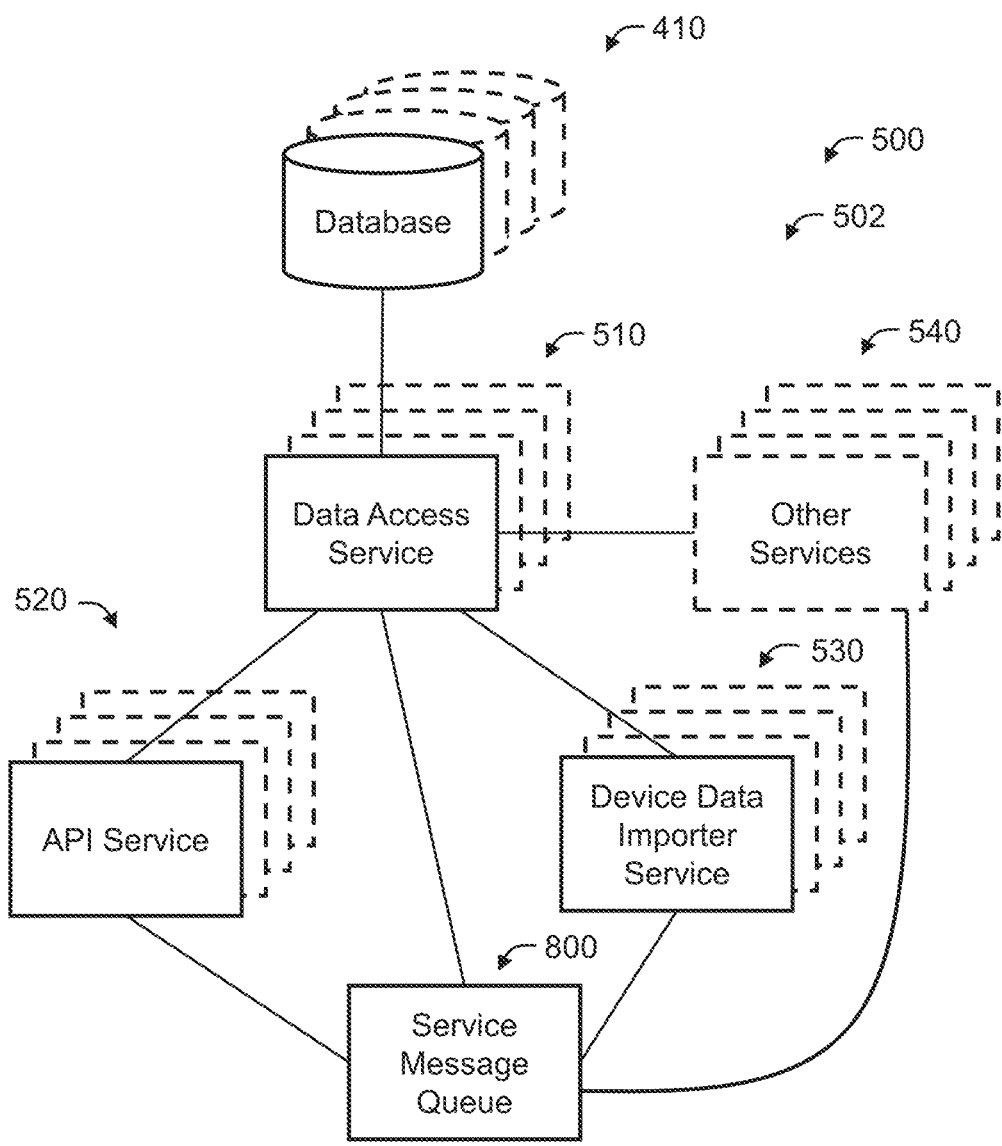
FIG. 8 is a block diagram of an example implementation of a service message queue for a fleet management application, in accordance with an embodiment.

Referring now to FIG. 8, there is shown, an example implementation of a service message queue 800 for a plurality of services 502. The service message queue 800 can store various messages received from the services 502 and make them available to other services. The messages can generally include any status or state information pertaining to the services 502. For example, the API service 520 may determine that a telematics device 130 is no longer associated with a particular tenant 160 and database 410. An indication that the telematics device 130 is no longer associated with the database 410 can be published at the service message queue 800. The device data importer service 530 can then read the message from the service message queue 800 and prevent telematics data imported from the telematics device 130 from being stored in the database 410. An advantage of the service message queue 800 is that the services 502 may not be required to request status updates from each other. Instead, a service 502 can monitor the service message queue 800 to identify relevant status updates from the other services.

Figure 9:
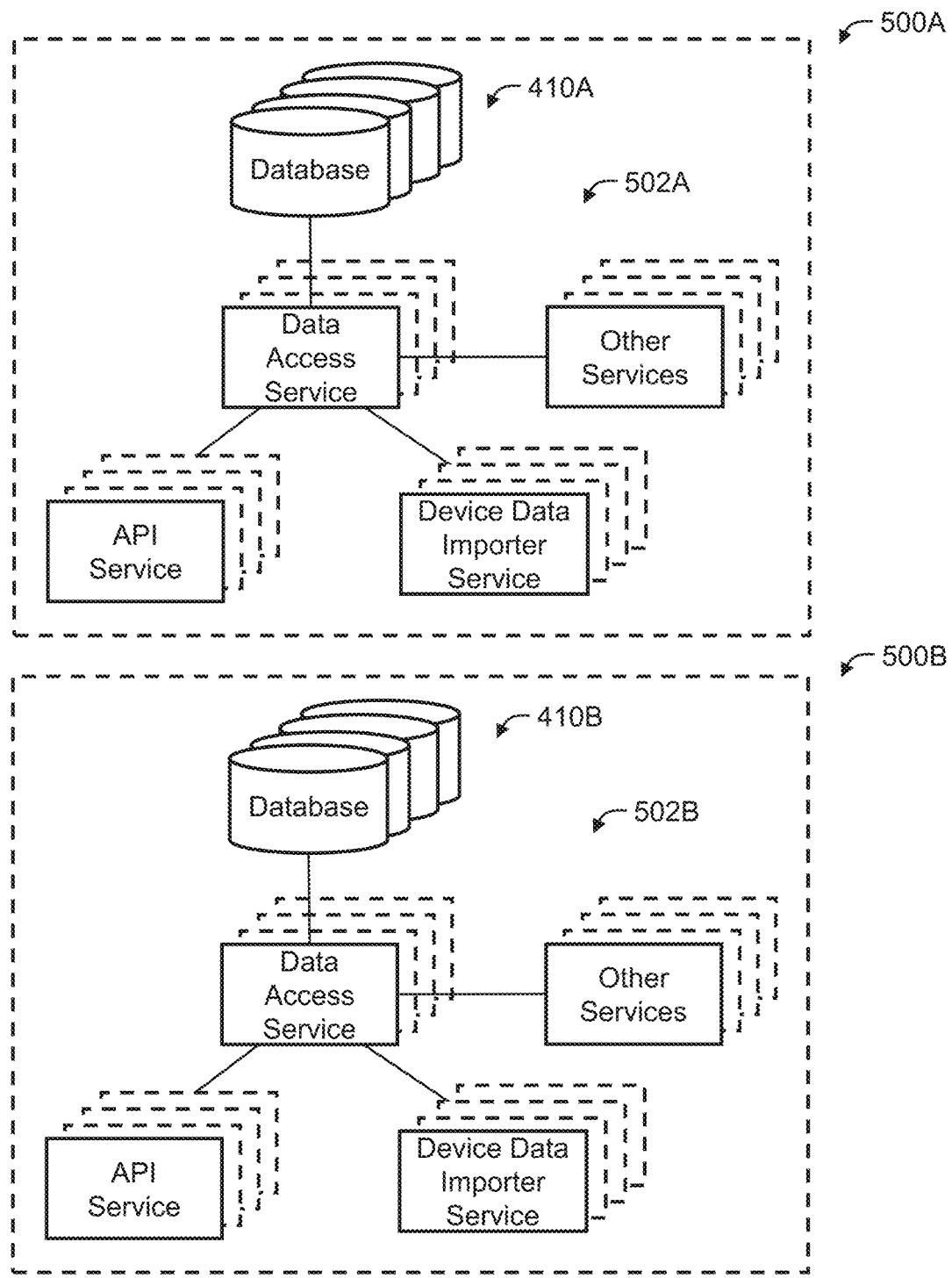
FIG. 9 is a block diagram of an example implementation of multiple fleet management applications, in accordance with an embodiment.

Referring now to FIG. 9, there is shown another example implementation of the fleet management application 500. In the illustrated example, there are two instances of the fleet management application 500A and 500B. As shown, the first application instance 500A can be deployed in a different geographical region, area, or zone as the second application instance 500B. In other words, each service 502A and database 410A of the first application instance 500A can be deployed on a computer server, cloud computer system, virtual machine, or container located within a first geographic region and each service 502B and database 410B of the second application instance 500B can be deployed on a computer server, cloud computer system, virtual machine, or container located in a second, different geographical region.

For example, the first application instance 500A may be deployed in different state, province, country, or continent, as the second application instance 500B. Deploying multiple instances of the fleet management application 500 in different geographical regions can achieve compliance with various legislative and regulatory data residency or localization requirements.

Figure 10:
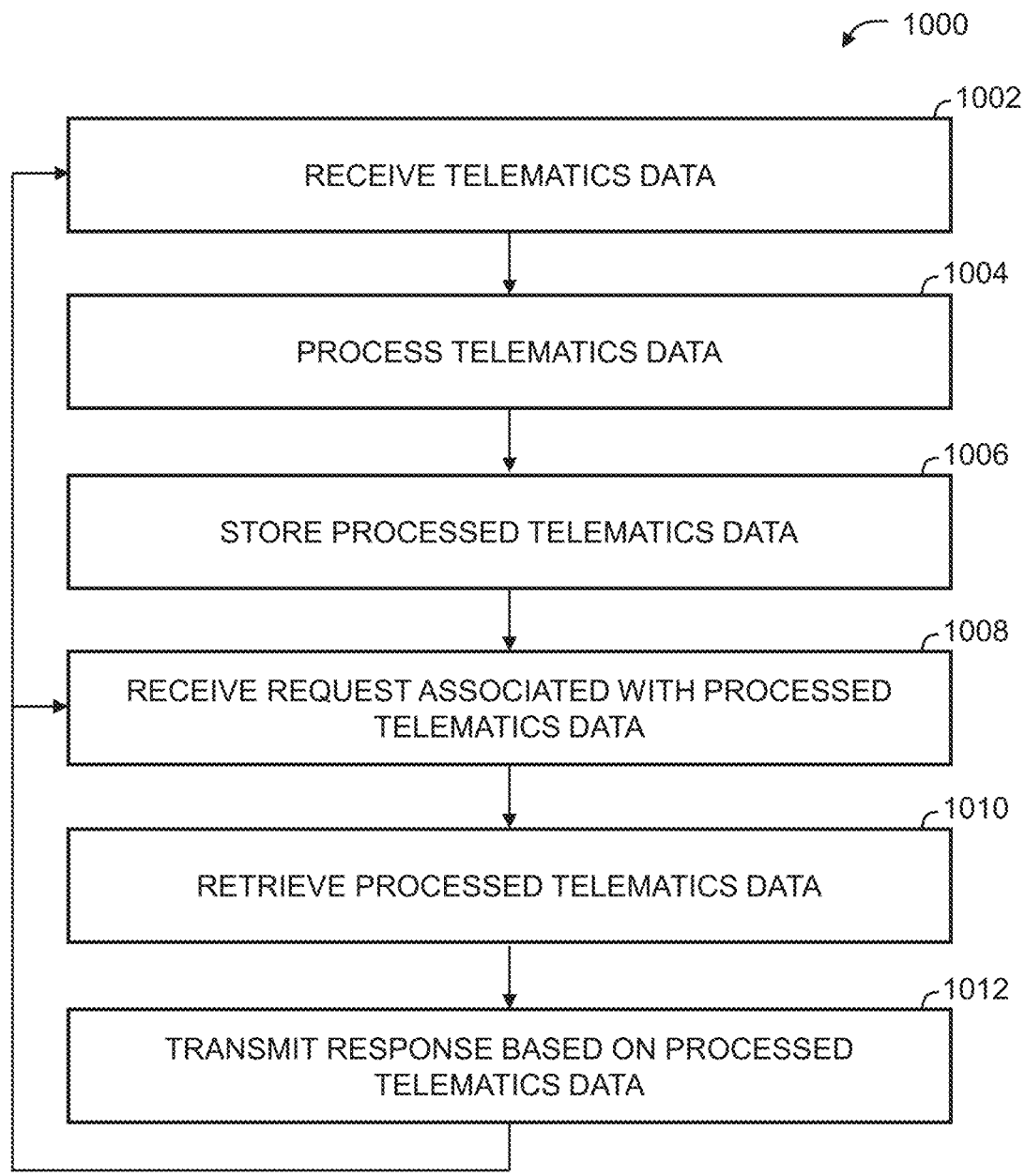
FIG. 10 is a flow chart of an example method for operating a fleet management system to provide a service-oriented fleet management application, in accordance with an embodiment.

Referring to FIG. 10, there is shown an example method 1000 of operating a fleet management system 110. Method 1000 can be implemented by the fleet management application system 110 to deploy the service-oriented fleet management application 500. Method 1000 can be implemented by the fleet management system 110 by operating at least one processor 112 to execute instructions stored on at least one data store 114.

At 1002, telematics data can be received by one or more device data importer services 530. For example, first telematics data and second telematics data can be received. The first telematics data can originate from a first plurality of telematics devices 130 installed in a first plurality of vehicles 120 and the second telematics data can originate from a second plurality of telematics devices 130 installed in a second plurality of vehicles 120. The telematics data can be directly or indirectly from the telematics devices 130. For example, the telematics data may be received from one or more intermediate systems, such as, but not limited to, gateways, bridges, protocol converters, etc. The first and second telematics data can be received by the same device data importer service 530 or different device data importer services 530. In some cases, a load balancer 600 may select one or more of the device data importer services 530 to receive the telematics data.

At 1004, the telematics data can be processed by the one or more device data importer services 530 to generate processed telematics data. For example, the first and second telematics data can be processed to generate first and second processed telematics data. As described herein, the telematics data can be processed in various ways. For example, the device data importer service 530 may parse streams of raw telematics data into formatted telematics data records. The parsing may involve aggregating or otherwise combining data. The parsing may involve translating status, diagnostic, or fault codes or identifiers. The parsing may also involve reformatting or converting the telematics data, for example, by applying conversion factors or offsets. The device data importer service 530 may also process the telematics data by generating additional data based on the raw telematics data. For example, the raw telematics data may be used to determine vehicle trips, stop durations, idling durations, etc. As another example, the raw telematics data may be used to identify exception events that violate predetermined rules or criteria, such as speeding, seatbelt non-compliance, harsh acceleration, braking, or cornering, etc. The first and second telematics data can be processed by the same device data importer service 530 or different device data importer services 530. In some cases, a load balancer 600 may select one or more of the device data importer services 530 to process the telematics data.

At 1006, the processed telematics data can be stored in the databases 410 using one or more data access services 510. For example, the first processed telematics data can be stored in a first database 410 associated with the first plurality of telematics devices 130 and the second processed telematics data in a second database 410 associated with the second plurality of telematics devices 130. The first and second databases 410 can be identified based on the tenants 160 associated with the telematics devices 130. For example, the first database 410 can be associated with a first tenant 160 associated with the first plurality of telematics devices 130 and the second database 410 can be associated with a second tenant 160 associated with the second plurality of telematics devices 130. In this manner, the first and second processed telematics data can be isolated and access thereto can be restricted by the fleet management application 500 to appropriate tenant 160.

In some embodiments, at least a portion of the processed telematics data can be stored in at least one distributed cache 700. For example, the one or more device data importer services 510 can store a portion of the first processed telematics data and a portion of the second processed telematics data in at least one distributed cache 700. In this manner, the portion of the processed telematics data can be accessed without retrieving it from the databases 410, which can reduce the amount of time required to access the processed telematics data.

The first and second processed telematics data can be stored by the same different data access service 510 or different data access services 510. In some cases, a load balancer 600 may select one or more of the data access services 510 to store the telematics data.

At 1008, one or more requests can be received by one or more application programing interface (API) services 520. The requests can be associated with the processed telematics data stored in the databases 410. For example, the one or more API services 520 can receive a first request associated with the first processed telematics data and a second request associated with the second processed telematics data. Various requests can be received and responded by the API services 506. For example, a web browser or other client application running on a computing device 150 may transmit requests for telematics data to the API service 520, receive responses with the requested telematics data, and display or present the telematics data to the user 160. In some cases, the API services 520 may determine tenants 160 associated with the requests. For example, the one or more API services 520 can determine a first tenant 160 associated with the first request and a second tenant 160 associated with the second request. The first and second requests can be received by the same API service 520 or different API services 520. In some cases, a load balancer 600 may select one or more of the API services 520 to receive the requests.

At 1010, at least some of the processed telematics data stored in the databases 410 can be retrieved by the one or more data access services 510. For example, at least some of the first processed telematics data can be retrieved from the first database 410 and at least some of the second processed telematics data can be retrieved from the second database 410. The one or more data access services 510 can identify the databases 410 based on the tenants 160 associated with the requests. For example, the one or more data access services 510 can identify the first database 410 based on the first tenant 160 and the second database 410 based on the second tenant 160.

In some embodiments, at least a portion of the processed telematics data can be retrieved from a distributed cache 700. As described herein, the distributed cache 700 can store stores frequently accessed or recently used data so that it can be accessed without retrieving it from the databases 410, which can reduce the amount of time required to access the data. For example, the API services 506 can retrieve the portion of the first processed telematics data and the portion of the second processed telematics data from at least one distributed cache 700.

The first and second processed telematics data can be retrieved by the same data access services 510 or different data access services 510. In some cases, a load balancer 600 may select one or more of the data access services 510 to retrieve the processed telematics data.

At 1012, one or more responses can be transmitted by the API services 520. The responses can be based on telematics data retrieved at 1010. For example, a first response to the first request can be transmitted based the first processed telematics data and a second response to the second request can be transmitted based the second processed telematics data. The responses transmitted by the API services 520 can include at least some of the processed telematics data the associated with request. For example, the responses may include the processed telematics data retrieved by the data access services 510. In some cases, the responses may include retrieved data that has been further processed. The first and second responses can be transmitted by the same API service 520 or different API services 520. In some cases, a load balancer 600 may select one or more of the API services 520 to retrieve the processed telematics data.

Referring back to FIG. 4A, another problem with the monolithic application 400 is that it can be difficult to deploy updates, upgrades, or patches to the application 400. Typically, the monolithic application 400 needs to be shut down or stopped when applying an update. Hence, the entire fleet management application 400 may be unavailable or offline to users 160 during an update. Frequent or larger updates may result in unacceptable amounts of downtime for users 160, particularly for critical features of the application 400.

One common type of update is a change to the schema of the databases 410. The database schema can define how telematics data is organized within a database 410. For example, the schema can define table names, fields, data types, and relationships of these entities. To update the schema of one or more of the databases 410, the monolithic application 400 typically also needs to be updated to be compatible with the new schema. As a result, databases schema updates can also result in unacceptable application downtime. The inventors recognized and realized that a different application architecture may ameliorate at least some these problems, which will now be explained with reference to FIG. 11.

Figures 11, 12:
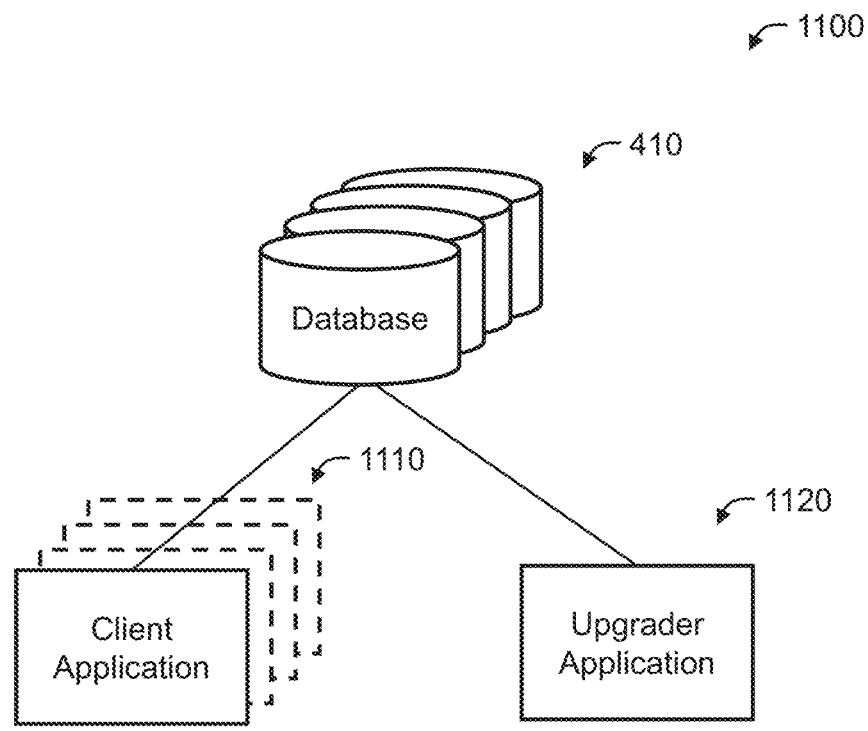
FIG. 11 is a block diagram of an example implementation of a fleet management application with an upgrader application, in accordance with an embodiment.
FIG. 12 is a table of an example record of client application connections, in accordance with an embodiment.

Referring to FIG. 11, there is shown another fleet management application 1100. The fleet management application 1100 is also a software application or computer program that can be executed by the fleet management system 110 and provide various functionality on the fleet management system 110. Likewise, the fleet management application 1100 can be connected to the plurality of databases 410 to store and retrieve various telematics data. As well, each database 410 can be associated with a single tenant or group of users 160.

In the illustrated example, the fleet management application 1100 includes one or more client applications 1110 and an upgrader application 1120. It should be appreciated that the upgrader application 1120 is a separate application from the client applications 1110. The client applications 1110 can perform various tasks or provide various functionalities. Generally, the client applications 1110 can connect to the databases 410 to provide access to telematics data. For example, the client applications 1110 may ingest, process, store, retrieve, and/or transmit telematics data originating from the telematics devices 130. The upgrader application 1120 can deploy various updates, upgrades, or patches to the databases 410. For example, the upgrader application 1120 update the schema of the databases 410. It should be appreciated that the client applications 1110 and upgrader application 1120 may be services 502 that form a service-oriented or microservice architecture, as described herein. The client applications 1110 and the upgrader application 1120 may be deployed across multiple computer servers, virtual machines, or containers.

An advantage of architecture of the fleet management application 1100 is that updates can be deployed to the databases 410 and client applications 1110 while the fleet management application 1100 is online or operational. For example, updates can be applied to individual client applications 1110 without affecting the entire application 1100. Since there can be more than one client application 1110, at least one client application 1110 can be operational or online while the other instances are stopped or taken offline and updated. From the perspective of the users 160, the fleet management application 1100 can have greater uptime and reliability than a traditional application architecture.

As will be appreciated, updates can be deployed in a staggered or rolling fashion to maximize uptime while performing upgrades or updates, such as database schema changes. For example, the upgrader application 1120 can apply updates to the schema of the databases 410 while ensuring schema compatibility by the client applications 1110. In operation, the upgrader application 1120 can determine a maximum supported schema version by each client application 1110 and determine which client applications 1110 are connected to each database 410. In this manner, the upgrader application 1120 can apply schema changes to databases 410 that are already supported by the client applications 1110 connected to those databases 410 (or wait until updates are applied to the client applications 110 to support the schema changes). Put another way, the upgrader application 1120 can avoid applying schema changes to a database 410 that would not be supported or compatible with a client application 1110 that is connected to that database 410.

Referring to FIG. 12, there is shown an example record of client application connections 1200 that can be maintained at one of the databases 410. As shown, each client application connection can correspond to an occurrence of a client application 1110 connecting to the database 410. As shown, each client application connection can include a client application name 1210, a client application connection time 1220, and a client application supported schema version 1230. The client application name 1210 can represent the name of the client application 1110, the client application connection time 1220 can represent the time at which the client application 1110 connected to the database 410, and the client application supported schema version 1230 can represent the latest or newest schema version supported by the client application 1110. The record of client application connections 1200 can be used by the upgrader application 1120 to determine which client applications are connected to the database 410 and the maximum supported schema version of those client applications 1110.

Figure 13:
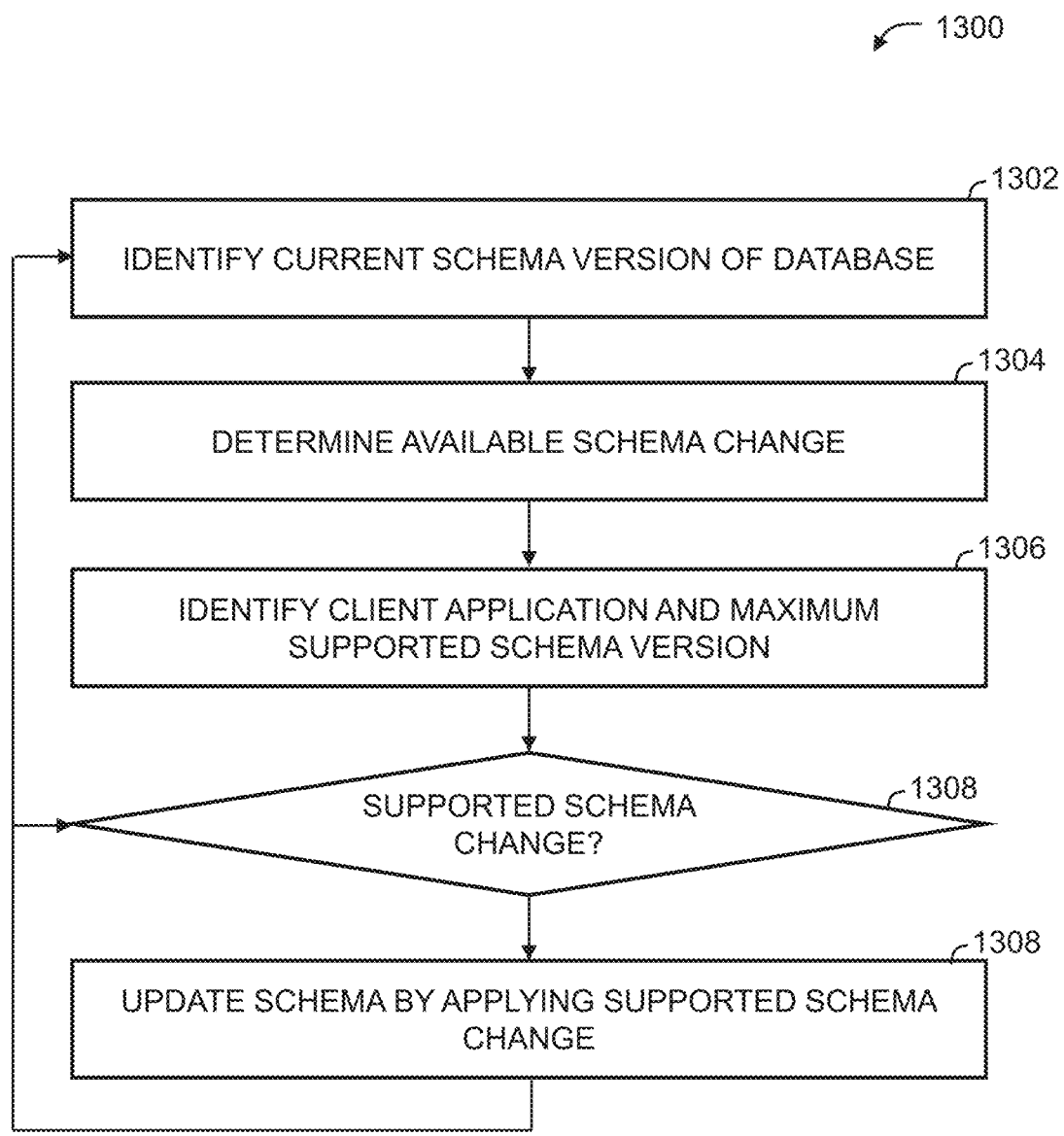
FIG. 13 is a flow chart of an example method for operating a fleet management system to provide online database upgrades, in accordance with an embodiment.

Referring to FIG. 13, there is shown an example method 1300 of operating a fleet management system 110. Method 1300 can be implemented by the fleet management application system 110 to deploy the online database upgrade compatible fleet management application 1100. Method 1300 can be implemented by the fleet management system 110 by operating at least one processor 112 to execute instructions stored on at least one data store 114.

At 1302, an upgrader application 1120 can determine a current schema version of a database 410. As will be appreciated, it may be necessary to change the schema of the database 410 over time with new developments to the database 410 or the fleet management application 1100. For example, the database schema may be modified to account for new types of telematics data or to support new features of the fleet management application 1100. Each state of the schema can be assigned a unique identifier, which can be referred to as a version. The upgrader application 1120 can determine the current schema version of the database 410 in various ways. In some embodiments, the current schema version of the database 410 may be determined based on data stored in the database 410. For example, the database 410 may store a data field that represents the schema version. In other cases, the schema version may be inferred based on other data stored at the database 410. For instance, the upgrader application 1120 may determine the schema version based on table names, fields, data types, and/or other indications stored at the database 410. In some embodiments, the upgrader application 1120 may maintain a record of the current schema version of the databases 410.

At 1304, the upgrader application 1120 can determine at least one available schema change for the database 410. Various types of schema changes can be available to be applied to the database 410. In general, a database schema change can involve any modification to a table, field, column, data, etc. For example, the schema change may involve adding, removing, and/or updating at least one column, table, and/or index of the database 410. As well, the schema change may involve modifying the data within at least one column of the database 410.

The at least one available schema change can be determined based on the current schema version of the database 410. For example, the upgrader application 1120 may be aware of a plurality of schema versions. The upgrader application 1120 can determine that there is at least one available schema change if there a schema version that is later or newer than the current schema version. The upgrader application 1120 may maintain a record of available schema versions or may otherwise obtain the available schema versions from another source.

At 1306, the upgrader application 1120 can determine at least one client application 1110 connected to the database 410 and a maximum supported schema version of the database 410 by the at least one client application 1110. The upgrader application 1120 can determine the at least one client application 1110 and maximum supported schema version in various ways. In some embodiments, the database 410 can store a record of client application connections to the database 410. In other words, the database 410 may maintain a record of each instance that a client application 1110 connects to the database 410. For example, the database 410 may store, for each client application connection, a client application name, a client application connection time, a client application supported schema version, etc. The upgrader application 1120 can determine that a client application 1110 is connected to the database 410 if it satisfies a predetermined recent connection time. In other words, the upgrader application 1120 can determine that the client application 1110 to be connected to the database 410 if the difference between the connection time and the current time is within the predetermined threshold. Put another way, the client application 1110 can be deemed to be connected to the database 410 if it connected to the database 410 within a sufficiently recent time.

At 1308, the upgrader application 1120 can determine at least one supported schema change for the database 410. The at least one supported schema change for the database 410 can be determined based on the current schema version and the maximum supported schema version. In other words, the upgrader application 1120 can identify a schema version that is newer or later than the current schema version but is still supported by the at least one client application 1110.

At 1310, the upgrader application 1120 can update the schema of the database 410 by applying the at least one supported schema change to the database 410. The schema of the database 410 can be updated by the upgrader application 1120 while the at least one client application 1110 is operational. As described herein, various types of schema changes can be applied to the database 410. For example, applying the schema change may involve adding, removing, and/or updating at least one column, table, and/or index of the database 410. As well, applying the schema change may involve modifying the data within at least one column of the database 410.

In some embodiments, the at least one client application 1110 can be updated to support or otherwise be compatible with the schema change applied to the database 410. For example, prior to determining the at least one supported schema change, the at least one client application 1110 can be updated to support the schema change. In some cases, the at least one client application 1110 can support both the current schema and the updated schema. For example, the at least one client application 1110 may detect whether the at least one supported schema change has been applied. In this manner, the at least one client application 1110 can determine whether to operate under the previous schema or the updated schema.

In some embodiments, the at least one client application 1110 can be updated subsequent to updating the schema of the database 410. The at least one client application 1110 can be updated to no longer support the previous schema of the database 410. In this manner, the at least one client application 1110 may no longer detect whether the at least one supported schema change has been applied.

In some embodiments, the at least one client application 1110 can include a plurality of instances. The plurality of instances of the at least one client application 1110 can be updated such that at least one instance of the at least one client application 1110 is operational while updating the at least one client application 1110. In other words, the instances of the at least one client application 1110 can be updated in a staggered or rolling fashion so that at least one client application 1110 is always operational. In this manner, the fleet management application 1100 can remain operational while it is updated.

Referring to FIG. 14, there is shown a table 1400 showing an example operation of the online database update compatible fleet management software application 1100. As shown, at time $t_1$ 1402, the schema of the database 410 is up to date and both the client application 1110 and upgrader application 1120 are at version 1.

At time $t_2$ 1404, the client application 1110 is updated to version 2 to support a schema change. As described herein, various changes can be made to the client application 1110 to allow for compatibility with the new schema. For example, if a new column is added to the database schema, the client application 1110 can be updated to detect if the column is present and use the column if detected. Likewise, if a column is removed from the database schema, the client application 1110 can be updated to detect if the column is present, and not use the column if it is not detected. Similarly, if an index is added or removed, the client application 1110 can be updated to detect whether the index exists and use or not use the index accordingly. As well, if data within a column is modified, the client application 1110 can be updated to use the updated data accordingly. Additionally, the client application 1110 can also be updated to use a new table or to no longer use a table that is to be deleted.

At time $t_3$ 1406, the upgrader application 1120 is updated to version 2 and the upgrader application 1120 applies the schema update to the database 410. It should be appreciated that the client application 1110 already supports the new schema, since the client application 1110 was already updated.

Depending on the on the type of schema update and update applied to the client application 1110, the client application 1110 can be subsequently updated (e.g., at $t_4$, which is not shown). The subsequent update can remove support for the previous schema by the client application 1110. For example, detection of new or deleted columns, indexes, tables, etc. can be removed from the client application 1110.

Further, additional, or combinations of updates to the client application 1110 and upgrader application 1120 can be applied to perform more complex changes to the schema. For example, a column can be updated by adding a new column (i.e., by updating the client application 1110 to detect the new column and upgrader application 1120 to add the new column to the schema) and removing the old column (i.e., by updating the client application 1110 to detect the old column and use the new column if the old column is not present and upgrader application 1120 to remove the old column from the schema).

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device. Furthermore, the term "coupled" may indicate that two elements can be directly coupled to one another or coupled to one another through one or more intermediate elements.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Furthermore, any recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). Programmable hardware such as FPGA can also be used as standalone or in combination with other devices. These devices may also have at least one input device (e.g., a pushbutton keyboard, mouse, a touchscreen, and the like), and at least one output device (e.g., a display screen, a printer, a wireless radio, and the like) depending on the nature of the device. The devices may also have at least one communication device (e.g., a network interface).

It should also be noted that there may be some elements that are used to implement at least part of one of the embodiments described herein that may be implemented via software that is written in a high-level computer programming language such as object-oriented programming. Accordingly, the program code may be written in C, C++ or any other suitable programming language and may comprise modules or classes, as is known to those skilled in object-oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

The invention claimed is:

1. A method for operating a fleet management system, the method comprising operating at least one processor to:
   receive, using a plurality of device data importer services, first telematics data and second telematics data, the first telematics data originating from a first plurality of telematics devices installed in a first plurality of vehicles, the second telematics data originating from a second plurality of telematics devices installed in a second plurality of vehicles;
   process, using the plurality of device data importer services, the first and second telematics data to generate first and second processed telematics data;
   store, using at least one data access service, the first processed telematics data in a first database associated with the first plurality of telematics devices and the second processed telematics data in a second database associated with the second plurality of telematics devices;
   receive, using a plurality of application programing interface (API) services, a first request associated with the first processed telematics data and a second request associated with the second processed telematics data;
   retrieve, using the at least one data access service, at least some of the first processed telematics data from the first database and at least some of the second processed telematics data from the second database; and
   transmit, using the plurality of API services, a first response to the first request based on the first processed telematics data and a second response to the second request based on the second processed telematics data.

2. The method of claim 1, wherein each device data importer service, data access service, and API service is executed in a separate virtual container.

3. The method of claim 1, further comprising operating the at least one processor to:
   store, using the plurality of device data importer services, a portion of the first processed telematics data and a portion of the second processed telematics data in at least one distributed cache; and
   retrieve, using the plurality of API services, the portion of the first processed telematics data and the portion of the second processed telematics data from the at least one distributed cache.

4. The method of claim 1, further comprising operating the at least one processor to:
   determine, using the plurality of API services, at least one telematics device in the first plurality of telematics devices that is no longer associated with the first database; and
   publish an indication that the at least one telematics device is no longer associated with the first database at a message queue.

5. The method of claim 1, wherein:
   the plurality of device data importer services comprises a load balancer operable to select one or more of the device data importer services to receive and process the first and second telematics data.

6. The method of claim 1, wherein:
   the plurality of API services comprises a load balancer operable to select one or more of the API services to receive the first and second requests and transmit the first and second responses.

7. The method of claim 1, wherein:
   the first and second telematics data is received and processed by the same device data importer service.

8. The method of claim 1, wherein:
   the first and second requests are received and the first and second responses are transmitted by the same API service.

9. The method of claim 1, further comprising operating the at least one processor to:
   determine, using the plurality of API services, a first tenant associated with the first request and a second tenant associated with the second request; and
   identify, using the at least one data access service, the first database based on the first tenant and the second database based on the second tenant.

10. The method of claim 1, further comprising operating the at least one processor to:
    upgrade, using the plurality of device data importer services, the schema of the first and second databases.

11. A non-transitory computer readable medium having instructions stored thereon executable by at least one processor to implement a method for operating a fleet management system, the method comprising operating the at least one processor to:
    receive, using a plurality of device data importer services, first telematics data and second telematics data, the first telematics data originating from a first plurality of telematics devices installed in a first plurality of vehicles, the second telematics data originating from a second plurality of telematics devices installed in a second plurality of vehicles;
    process, using the plurality of device data importer services, the first and second telematics data to generate first and second processed telematics data;
    store, using at least one data access service, the first processed telematics data in a first database associated with the first plurality of telematics devices and the second processed telematics data in a second database associated with the second plurality of telematics devices;
    receive, using a plurality of application programing interface (API) services, a first request associated with the first processed telematics data and a second request associated with the second processed telematics data;
    retrieve, using the at least one data access service, at least some of the first processed telematics data from the first database and at least some of the second processed telematics data from the second database; and
    transmit, using the plurality of API services, a first response to the first request based on the first processed telematics data and a second response to the second request based on the second processed telematics data.

12. A fleet management system comprising:
    at least one data store operable to store a first and second database, the first database associated with a first plurality of telematics devices installed in a first plurality of vehicles, the second database associated with a second plurality of telematics devices installed in a second plurality of vehicles;

at least one processor operable to execute:
  a plurality of device data importer services operable to:
    receive first telematics data and second telematics data, the first telematics data originating from the first plurality of telematics devices, the second telematics data originating from the second plurality of telematics devices; and
    process the first and second telematics data to generate first and second processed telematics data;
  at least one data access service operable to:
    store the first processed telematics data in the first database and the second processed telematics data in the second database; and
    retrieve at least some of the first processed telematics data from the first database and at least some of the second processed telematics data from the second database; and
  a plurality of application programing interface (API) services operable to:
    receive a first request associated with the first processed telematics data and a second request associated with the second processed telematics data; and
    transmit a first response to the first request based on the first processed telematics data and a second response to the second request based on the second processed telematics data.

13. The system of claim 12, wherein each device data importer service, data access service, and API service is executed in a separate virtual container.

14. The system of claim 12, wherein:
the plurality of device data importer services is operable to store a portion of the first processed telematics data and a portion of the second processed telematics data in at least one distributed cache; and
the plurality of API services is operable to retrieve the portion of the first processed telematics data and the portion of the second processed telematics data from the at least one distributed cache.

15. The system of claim 12, wherein the plurality of API services is operable to:
determine at least one telematics device in the first plurality of telematics devices that is no longer associated with the first database; and
publish an indication that the at least one telematics device is no longer associated with the first database at a message queue.

16. The system of claim 12, wherein:
the plurality of device data importer services comprises a load balancer operable to select one or more of the device data importer services to receive and process the first and second telematics data.

17. The system of claim 12, wherein:
the plurality of API services comprises a load balancer operable to select one or more of the API services to receive the first and second requests and transmit the first and second responses.

18. The system of claim 12, wherein:
the first and second telematics data is received and processed by the same device data importer service.

19. The system of claim 12, wherein:
the first and second requests are received and the first and second responses are transmitted by the same API service.

20. The system of claim 12, wherein:
the plurality of API services is operable to determine a first tenant associated with the first request and a second tenant associated with the second request; and
the at least one data access service is operable to identify the first database based on the first tenant and the second database based on the second tenant.

21. The system of claim 12, wherein:
the plurality of device data importer services is operable to upgrade the schema of the first and second databases.

* * * * *